Dec. 12, 1967  K. H. HAASE  3,358,151
VOLTAGE SUPPLY SOURCE PROVIDING STABLE VOLTAGES AT RESISTOR
TAPS REPRESENTING COEFFICIENTS OF TERMS
IN A POLYNOMIAL EQUATION
Filed Jan. 26, 1965
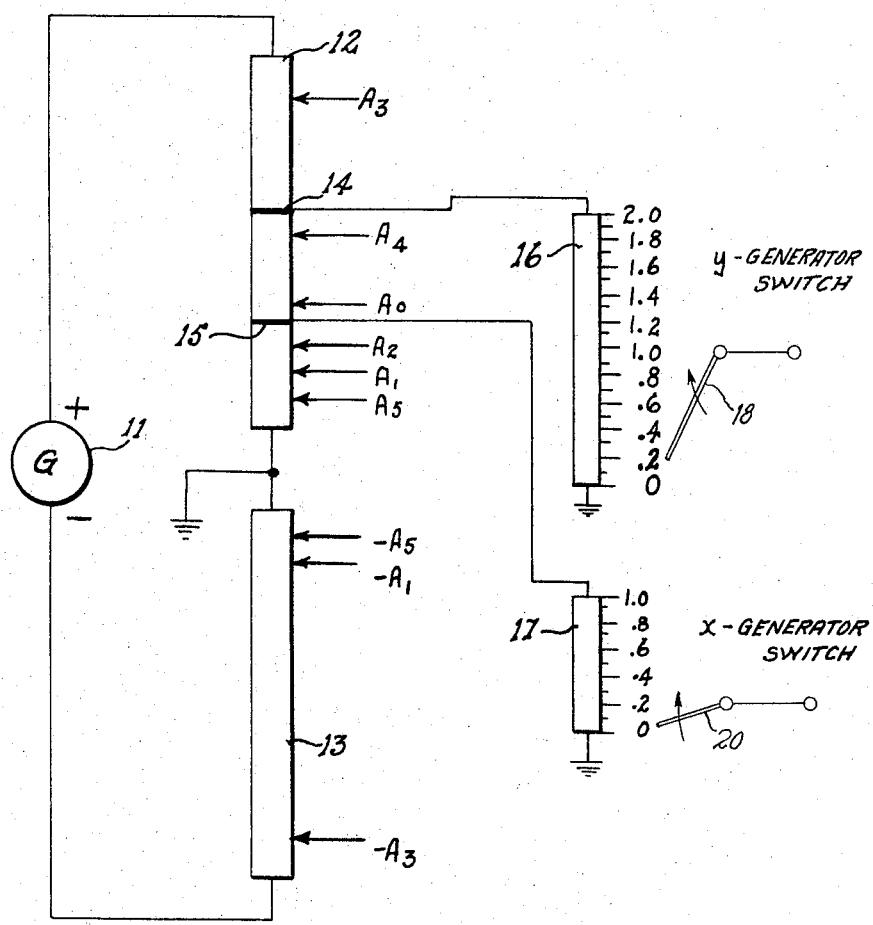
INVENTOR.
KURT H. HAASE
BY
ATTORNEYS

United States Patent Office 3,358,151
Patented Dec. 12, 1967

3,358,151
VOLTAGE SUPPLY SOURCE PROVIDING STABLE VOLTAGES AT RESISTOR TAPS REPRESENTING COEFFICIENTS OF TERMS IN A POLYNOMIAL EQUATION
Kurt H. Haase, Watertown, Mass., assignor to the United States of America as represented by the Secretary of the Air Force
Filed Jan. 26, 1965, Ser. No. 428,271
3 Claims. (Cl. 307—15)

ABSTRACT OF THE DISCLOSURE

A power supply providing stable voltage from resistor taps representing coefficients of terms in a polynomial equation which is supplied to an analog computer for finding the roots of the equation.

The invention described herein may be manufactured and used by or for the United States Government for governmental purposes without payment to me of any royalty thereon.

This invention relates to a supply voltage system, and more particularly to a supply voltage system for use in an analog computer for finding roots of a polynomial. In my copending application filed on the same date herewith entitled, Polynomial Root Finder, and having Ser. No. 428,275, a unique computer device is described for finding the roots of a polynomial of the type $$f(z) = z^6 + A_5 z^5 + A_4 z^4 + A_3 z^3 + A_2 z^2 + A_1 z + A_0 = 0$$

A system of equations is derived from the polynomial of the type $$Z_{00} \cdot 1 + Z_{01} \cdot A_5 + Z_{02} \cdot A_4 + Z_{03} \cdot A_3 + Z_{04} \cdot A_2 + Z_{05} \cdot A_1 + Z_{06} \cdot A_0 = 0$$

where the Z's are particular functions of $x$ and $y$, depending on the order of the polynomial. To solve the polynomial using an analog computer, it is necessary to obtain voltage values representing the coefficients $A_5, A_4 \ldots A_0$ and also values of $x$ and $y$. This invention shows a system for obtaining stable values of $x$ and $y$ and of the A's even if the central voltage supply is unstable.

It is therefore an object to provide a system for obtaining stable voltage for use in an analog computer.

It is another object to provide a system for obtaining stable voltage values for finding the roots of a polynomial using an analog computer.

These and other objects will become more apparent from the following description taken in connection with the accompanying drawing which shows a diagram of an embodiment of the invention.

In an analog computer the variables $x$ and $y$ are of the same character as the coefficients $A_0, A_1 \ldots A_6$ being all voltage strengths.

If they came from separate sources and the generators were not stable an error would arise which this invention circumvents.

Referring to the drawing in detail, a general example is shown and it is assumed that the coefficients $A_0$, $A_1 \ldots A_5$ are greater than one and that one of the coefficients is even greater than two. It is also assumed that magnitude of these coefficients is not in the sequence of their sub-index. Thus, $$A_3 > 2.0, 2.0 > A_4 > A_0 > 1.0$$

and $$1.0 > A_2 > A_1 > A_5$$

and all of these coefficients are positive.

Main generator 11 feeds a calibrated and balanced potentiometer having upper part 12 and lower part 13. Upper potentiometer has two fixed taps 14 and 15 with one at voltage 1.0, and the other at voltage 2.0, respectively. Tap 14 is connected to a third potentiometer 16 followed by a $y$-generator switch 18 and tap 15 is connected to a fourth potentiometer 17 followed by an $x$-generator switch 20. The voltage generated by generator 11 has to be sufficient in this case to give the value of $A_3$ which is the highest value of the coefficients. We tap $A_0$, $A_2$, $A_4$, by calibration of upper potentiometer 12 only. Coefficient $A_6$ is always one and therefore this voltage is taken from tap 15, the same as fourth potentiometer 17. The coefficients $A_1$, $A_3$, $A_5$ are tapped twice, once on upper potentiometer 12 and once on lower potentiometer 13. Hence both potentials $\pm A_1$, $\pm A_3$, and $\pm A_5$ are available. The variables $x$ and $y$ and the values of the coefficient come from the same source and thus the same result is always obtained even if the common source is unstable.

What is claimed is:
1. An apparatus for obtaining stable voltage values for use in an analog computer for finding roots of a polynomial that requires values of the coefficients to be expressed in two forms, the original form and a second form as a function of two variables, the apparatus comprising: a central voltage source; a first resistor and a second resistor in series with the central voltage source, each resistor having a plurality of taps for obtaining a particular value of voltage with each tap representing a coefficient of the polynomial expressed in the original form, the first resistor having two fixed taps; and means for obtaining a plurality of voltage values connected to the two fixed taps.

2. An apparatus for obtaining stable voltage values for use in an analog computer for finding roots of a polynomial that requires values of the coefficients to be expressed in two forms, the original form and a second form as a function of two variables; the apparatus comprising; a central voltage source; a first resistor and second resistor in series with the central voltage source, each resistor having a plurality of taps for obtaining a particular value of voltage with each tap representing a coefficient of the polynomial expressed in the original form, the first resistor having two fixed taps; and a first and second potentiometer connected to the two fixed taps, each potentiometer having a plurality of taps for obtaining voltage values corresponding to the two variables, the two variables being stable in respect to the voltage values of the coefficients expressed in the original form.

3. An apparatus for obtaining stable voltage values according to claim 2 which further comprises a first switch and a second switch connected to the first and second potentiometer respectively.

References Cited
UNITED STATES PATENTS

| | | | |
|---|---|---|---|
| 2,643,821 | 6/1953 | Frager | 235—180 |
| 2,889,506 | 6/1959 | Fogiel | 323—79 X |
| 3,063,637 | 11/1962 | Burhans | 235—184 |
| 3,264,551 | 8/1966 | Segawa | 323—74 |

JOHN F. COUCH, *Primary Examiner.*

W. E. RAY, *Assistant Examiner.*